(12) United States Patent
Sarkar et al.

(10) Patent No.: US 12,440,147 B2
(45) Date of Patent: Oct. 14, 2025

(54) SYSTEMS AND METHODS FOR EVALUATING AND MITIGATING PROBLEM BEHAVIOR BY DETECTING PRECURSORS

(71) Applicants: Vanderbilt University, Nashville, TN (US); North Carolina State University, Raleigh, NC (US)

(72) Inventors: Nilanjan Sarkar, Brentwood, TN (US); Zhaobo Zheng, Nashville, TN (US); Amy S. Weitlauf, Nashville, TN (US); John Staubitz, Nashville, TN (US); Zachary E. Warren, Nashville, TN (US); James P. Dieffenderfer, Raleigh, NC (US)

(73) Assignees: Vanderbilt University, Nashville, TN (US); North Carolina State University, Raleigh, NC (US)

( * ) Notice: Subject to any disclaimer, the term of this patent is extended or adjusted under 35 U.S.C. 154(b) by 513 days.

(21) Appl. No.: 17/856,528

(22) Filed: Jul. 1, 2022

(65) Prior Publication Data
US 2023/0000423 A1  Jan. 5, 2023

Related U.S. Application Data

(60) Provisional application No. 63/217,585, filed on Jul. 1, 2021.

(51) Int. Cl.
*A61B 5/00* (2006.01)
*A61B 5/0205* (2006.01)
(Continued)

(52) U.S. Cl.
CPC ........ *A61B 5/4076* (2013.01); *A61B 5/02055* (2013.01); *A61B 5/0531* (2013.01);
(Continued)

(58) Field of Classification Search
CPC ....... A61B 5/4076; A61B 5/0531; A61B 5/11; A61B 5/4803; A61B 5/6804; A61B 5/681;
(Continued)

(56) References Cited

U.S. PATENT DOCUMENTS

| | | | |
|---|---|---|---|
| 2021/0195732 A1* | 6/2021 | Longinotti-Buitoni | ..................... H05K 3/361 |
| 2022/0202373 A1* | 6/2022 | Yocca | .................. A61B 5/4035 |

OTHER PUBLICATIONS

Y. -C. Yu, "A Cloud-Based Mobile Anger Prediction Model," 2015 18th International Conference on Network-Based Information Systems, Taipei, Taiwan, 2015 (Year: 2015).*

(Continued)

*Primary Examiner* — Eric F Winakur
*Assistant Examiner* — Sienna C Pyle
(74) *Attorney, Agent, or Firm* — Michael Best & Friedrich LLP

(57) ABSTRACT

Systems and methods for predicting problem behavior in individuals with developmental and behavior disabilities. A plurality of sensors are configured to collect multimodal data signals of a subject individual including a wearable upper body motion sensing device with a plurality of inertial measurement units (IMUs). An electronic controller is configured to receive output signals from each of IMUs and to model an upper body position of the subject individual based on the output signals from the IMUs. A trained machine-learning model is then applied by providing an input data set that includes multimodal signal data (e.g., including signal data from at least one IMU) and/or features extracted from the multimodal signal data. The machine-learning model is trained to produce as output an indication of whether a precursor to the problem behavior is detected and, in response to detecting the precursor, a notification (or alarm) is generated.

19 Claims, 7 Drawing Sheets

(51) Int. Cl.
 A61B 5/024 (2006.01)
 A61B 5/0531 (2021.01)
 A61B 5/11 (2006.01)
 G16H 20/70 (2018.01)
 G16H 40/63 (2018.01)
(52) U.S. Cl.
 CPC .............. *A61B 5/11* (2013.01); *A61B 5/4803* (2013.01); *A61B 5/6804* (2013.01); *A61B 5/681* (2013.01); *A61B 5/7221* (2013.01); *A61B 5/7267* (2013.01); *A61B 5/74* (2013.01); *G16H 20/70* (2018.01); *G16H 40/63* (2018.01); *A61B 5/02438* (2013.01); *A61B 2562/0204* (2013.01); *A61B 2562/0219* (2013.01); *A61B 2562/04* (2013.01)
(58) Field of Classification Search
 CPC .............. A61B 5/7267; A61B 5/02438; A61B 2562/0204; A61B 2562/0219; A61B 2562/04; G16H 20/70
 See application file for complete search history.

(56) References Cited

OTHER PUBLICATIONS

T. Roushan et al., "Towards Predicting Risky Behavior Among Veterans with PTSD by Analyzing Gesture Patterns," 2019 IEEE 43rd Annual Computer Software and Applications Conference (Year: 2019).*
Adafruit TCA9548A. Available online: https://www.adafruit.com/product/2717 (accessed on Jan. 26, 2021 at https://web.archive.org/web/20220125045312/https://www.adafruit.com/product/2717) (7 pages).
Albinali, F. et al. "Detecting stereotypical motor movements in the classroom using accelerometry and pattern recognition algorithms," Pervasive Mob. Comput., vol. 8, No. 1, pp. 103-114, 2012.
Aman MG, et al. The aberrant behavior checklist: a behavior rating scale for the assessment of treatment effects. Am J Ment Defic. 1985;89(5):485-491.
Bailey, J. D., et al. (2021). Machine Learning for Supplementing Behavioral Assessment. Perspectives on Behavior Science, 1-15.
Baio, J. et al. "Prevalence of autism spectrum disorder among children aged 8 years—autism and developmental disabilities monitoring network, 11 sites, United States, 2014." MMWR Surveillance Summaries 67, No. 6 (2018): 1.
Bangor A, et al. Technology Acceptance Model: An empirical evaluation of the system usability scale. Intl. Journal of Human-Computer Interaction. Jul. 29, 2008;24(6):574-94.
Belgiu M. et al. "Random forest in remote sensing: A review of applications and future directions," ISPRS Journal of Photogrammetry and Remote Sensing. 2016.
Bian D. et al., "A Novel Multisensory Stimulation and Data Capture System (MADCAP) for Investigating Sensory Trajectories in Infancy," IEEE Trans. Neural Syst. Rehabil. Eng., vol. 26, No. 8, pp. 1526-1534, 2018.
Bosch. BNO055. Available online: https://www.bosch-sensortec.com/products/smart-sensors/bno055/ (accessed on Apr. 16, 2021 at https://web.archive.org/web/20210416021854/https://www.bosch-sensortec.com/products/smart- sensors/bno055/) (16 pages).
Bourret, J. C., et al. (2014). Visual analysis in single-case research. In G. J. Madden, W. V. Dube, T. D. Hackenberg, G. P. Hanley, & K. A. Lattal (Eds.), APA handbook of behavior analysis (pp. 191-218). American Psychological Association.
Boyd, BA et al (2011). Effects of family-implemented treatment on the repetitive behaviors of children with autism. Journal of Autism and Developmental Disorders41(10): 1330-41.
Breiman, L. "Random forests." Machine learning 45.1 (2001): 5-32.
Bullock, C.E. et al. "Description and Validation of a Computerized Behavioral Data Program: 'bDataPro,'" Behav. Anal., vol. 40, No. 1, pp. 275-285, 2017.
Cambria, E. Affective Computing and Sentiment Analysis. IEEE Intell. Syst. 2016, 31, 102-107.
Cantin-Garside, K.D. et al. "Detecting and Classifying Self-injurious Behavior in Autism Spectrum Disorder Using Machine Learning Techniques," J. Autism Dev. Disord., 2020.
Carter AS, et al. The Vineland Adaptive Behavior Scales: supplementary norms for individuals with autism. J Autism Dev Disord. 1998;28(4):287-302.
Catalyst. DataFinch. Available online: https://datafinch.com/aba-data-collection/ (accessed on Feb. 4, 2021 at https://web.archive.org/web/20210204224706/https://datafinch.com/aba-data-collection/) (10 pages).
Cerlinca T.I. et al. "Robust 3D hand detection for gestures recognition," Stud. Comput. Intell., vol. 382, pp. 259-264, 2011.
Chadwick, O. et al. "Factors affecting the risk of behaviour problems in children with severe intellectual disability," J. Intellect. Disabil. Res., vol. 44, No. 2, pp. 108-123, 2000.
Chakraborty, B.K. et al. "Review of constraints on vision-based gesture recognition for human-computer interaction," IET Comput. Vis., vol. 12, No. 1, pp. 3-15, 2018.
Coffey, A.L. et al. "Interview-Informed Synthesized Contingency Analysis (IISCA): Novel Interpretations and Future Directions," Behav. Anal. Pract., vol. 13, No. 1, pp. 217-225, 2020.
Cohen I, et al. Assessing challenging behaviors in Autism Spectrum Disorders: Prevalence, rating scales, and autonomic indicators. In: International handbook of autism and pervasive developmental disorders. New York, NY: Springer; 2011:247-270.
Cohn, J. F., et al. "Measuring facial action." The new handbook of methods in nonverbal behavior research (2005): 9-64.
Curtis KS, et al. Evaluation of a trial-based interview-informed synthesized contingency analysis. Journal of Applied Behavior Analysis. 2019.
Danov, S. E., et al. (2008). A survey evaluation of the reliability of visual inspection and functional analysis graphs. Behavior Modification, 32(6), 828-839.
Delaherche, E.; et al. Assessment of the communicative and coordination skills of children with Autism Spectrum Disorders and typically developing children using social signal processing. Res. Autism Spectr. Disord. 2013, 7, 741-756.
Dowdy, A., et al. "Structured visual analysis of single-case experimental design data: Developments and technological advancements." Journal of Applied Behavior Analysis 55.2 (2022): 451-462.
Empatica. E4 Wristband. Available online: https://www.empatica.com/research/e4/ (accessed on Mar. 15, 2021 at https://web.archive.org/web/20210315223810/https://www.empatica.com/research/e4/) (17 pages).
Evidence Based Practice Brief: Functional Behavior Assessment. In: ASD. NPDCo, ed2010.
Fisher, W. W., et al. (2003). Visual aids and structured criteria for improving visual inspection and interpretation of single-case designs. Journal of Applied Behavior Analysis, 36(3), 387-406.
Gabriels, R. L., et al. "Repetitive behaviors in autism: Relationships with associated clinical features." Research in developmental disabilities 26, No. 2 (2005): 169-181.
Gehlert, S. et al. "Theories of health behavior." Handbook of health social work (2019): 143-163.
Ghaemmaghami M, et al. Shaping complex functional communication responses. Journal of Applied Behavior Analysis. 2018;51(3):502-520.
Goodwin M.S. et al., "Predicting imminent aggression onset in minimally-verbal youth with autism spectrum disorder using preceding physiological signals," ACM Int. Conf. Proceeding Ser., pp. 201-207, 2018.
Goodwin MS. Enhancing and Accelerating the Pace of Autism Research and Treatment The Promise of Developing Innovative Technology. Focus Autism Dev Dis. 2008;23(2):125-128.
Gotham K, et al. The Autism Diagnostic Observation Schedule: revised algorithms for improved diagnostic validity. J Autism Dev Disord. 2007;37(4):613-627.

(56) References Cited

OTHER PUBLICATIONS

Gotham K, et al. (2018)Pupil response to social-emotional material is associated with rumination and depression in adults with autismPLOS One, 12(8). e0200340.
Gover, H.C.; et al. A review of environmental enrichment as treatment for problem behavior maintained by automatic reinforcement. J. Appl. Behav. Anal. 2019.
Guldberg K. Evidence-based practice in autism educational research: can we bridge the research and practice gap? Oxford Review of Education. 2017;43(2):149-161.
Hagopian, L. P., et al. (1997). Toward the development of structured criteria for interpretation of functional analysis data. Journal of Applied Behavior Analysis, 30(2), 313-326.
Hanley GP, et al. Producing meaningful improvements in problem behavior of children with autism via synthesized analyses and treatments. Journal of Applied Behavior Analysis. 2014;47(1):16-36.
Happy S.L. et al. "Automatic Facial Expression Recognition Using Features of Salient Facial Patches," IEEE Trans. Affect. Comput., vol. 6, No. 1, pp. 1-12, 2015.
Healy, O. et al. "Behavioral Interventions for Aggressive Behaviors in Autism Spectrum Disorders," Comprehensive Guide to Autism. pp. 461-486, 2014.
Imbiriba, T. et al. "Biosensor prediction of aggression in youth with autism using kernel-based methods," ACM Int. Conf. Proceeding Ser., pp. 88-93, 2020.
Jessel J, et al. An evaluation of the single-session interview-informed synthesized contingency analysis. Behavioral Interventions. 2018;34(1):62-78.
Jessel J, et al. Interview-informed synthesized contingency analyses: Thirty replications and reanalysis. Journal of Applied Behavior Analysis. 2016;49(3):576-595.
Jessel J, et al. On the Standardization of the Functional Analysis. Behavior Analysis in Practice. 2020;13(1):205-216.
Jessel J, et al. Achieving socially significant reductions in problem behavior following the interview-informed synthesized contingency analysis: A summary of 25 outpatient applications. Journal of applied behavior analysis. 2018;51(1):130-157.
Jessel, J., et al. (2020a). Does analytic brevity result in loss of control? A consecutive case series of 26 single-session interview-informed synthesized contingency analyses. Behavioral Interventions, 35(1), 145-155.
Thompson RH, et al. A descriptive analysis of social consequences following problem behavior. Journal of Applied Behavior Analysis. 2001;34(2):169-178.
Turgeon, S., et al. (2020). Tutorial: Applying machine Learning in behavioral research. Perspectives on Behavior Science, 43(4), 697-723.
Unity3D. Unity Editor. Available online: https://unity.com/ (accessed on Jan. 6, 2021) (13 pages).
Warner C.A. et al., "Toward accurate inferences of response class membership," J. Appl. Behav. Anal., vol. 53, No. 1, pp. 331-354, 2020.
Warner C.A., "Progressive Applications of Extinction Procedures to Assess Response Class Membership of Multiple Topographies of Problem Behavior," 2019.
Warner-Cohen J, et al. Epidemiology and course of disruptive disorders. In: Treating disruptive disorders: A guide to psychological, pharmacological, and combined therapies. New York, NY, US: Routledge/Taylor & Francis Group; 2015:51-68.
Webber LS, et al. Restrictive Interventions for People with a Disability Exhibiting Challenging Behaviours: Analysis of a Population Database. 2011;24(6): 495-507.
Wiskirchen R, et al. Functional analysis: A need for clinical decision support tools to weigh risks and benefits. Behavior Analysis: Research and Practice. 2017;17(4):325-333.
Wisner-Carlson R, et al. The Transition to Adulthood for Young People with Autism Spectrum Disorder. Child and adolescent psychiatric clinics of North America. 2020;29(2):345-358.
Wong C, et al. Evidence-Based Practices for Children, Youth, and Young Adults with Autism Spectrum Disorder: A Comprehensive Review. Journal of Autism and Developmental Disorders. 2015;45(7):1951-1966.
Wu D. et al., "Optimal arousal identification and classification for affective computing using physiological signals: Virtual reality stroop task," IEEE Trans. Affect. Comput., vol. 1, No. 2, pp. 109-118, 2010.
Yan, X.; et al.Wearable IMU-based real-time motion warning system for construction workers' musculoskeletal disorders prevention. Autom. Constr. 2017, 74, 2-11.
Yeasin M, et al. Recognition of facial expressions and measurement of levels of interest from video. IEEE Transactions on Multimedia. 2006;8(3):500-508.
Zeng, D.. "Session 8-Tools: Jupyter Notebook & Python for Data Scientists." (2020) (2 pages).
Zhai J. et al. "Stress detection in computer users through non-invasive monitoring of physiological signals," Biomed. Sci. Instrum., vol. 42, pp. 495-500, 2006.
Zhai, J. et al. "Stress detection in computer users based on digital signal processing of noninvasive physiological variables." In 2006 international conference of the IEEE engineering in medicine and biology society, pp. 1355-1358. IEEE, 2006.
Zheng, Z. K., et al. (2021). A predictive multimodal framework to alert caregivers of problem behaviors for children with ASD (PreMAC). Sensors, 21(2), 370-389.
Zheng, Z.K.; et al. Soft-Brush: A Novel Tendon Driven Tactile Stimulator for Affective Touch in Children with Autism. In International Conference on Applied Human Factors and Ergonomics; Springer: Cham, Switzerland, 2018; pp. 15-22.
Jessel, J., et al. (2020b). Evaluating the boundaries of analytic efficiency and control: A consecutive controlled case series of 26 functional analyses. Journal of Applied Behavior Analysis, 53(1), 25-43.
Johnston, D. et al. "Measuring the behavioral response to spatial audio within a multi-modal virtual reality environment in children with autism spectrum disorder," Appl. Sci., vol. 9, No. 15, 2019.
Kahng S, et al. The safety of functional analyses of self-injurious behavior. 2015;48(1):107-114.
Kanne SM, et al. Aggression in children and adolescents with ASD: prevalence and risk factors. J Autism Dev Disord. 2011;41(7):926-937.
Kapur, A. et al. "Gesture-Based Affective Computing on Motion," 1st Int. Conf. Affect. Comput. Intell. Interact. (ACII 2005), pp. 1-7, 2005.
Kluyver, T., et al. (2016). Jupyter Notebooks—a publishing format for reproducible computational workflows (vol. 2016, pp. 87-90).
Lambert JM, et al. Outcome summaries of latency-based functional analyses conducted in hospital inpatient units. J Appl Behav Anal. 2017;50(3):487-494.
Lanovaz, M. J., et al. (2020). Machine learning to analyze single-case data: A proof of concept. Perspectives on Behavior Science, 1-18.
Lecavalier L, et al. (2020)Development of the Behavioral Inflexibility Scale for children with autism and other developmental disabilitiesAutism Research 12(3) 489-499.
Lenovo. Tab4. Available online: https://www.lenovo.com/us/en/tablets/android-tablets/lenovo-tab-series/c/lenovo-tab-series (accessed on Nov. 4, 2020) (5 pages).
Lim C.L. et al., "Decomposing skin conductance into tonic and phasic components," Int. J. Psychophysiol., 1997.
Littlewort G. et al., "The computer expression recognition toolbox (CERT)," 2011 IEEE Int. Conf. Autom. Face Gesture Recognit. Work. FG 2011, pp. 298-305, 2011.
Lord C, et al. The Autism Diagnostic Observation Schedule-Generic: A standard measure of social and communication deficits associated with the spectrum of autism. Journal of Autism and Developmental Disorders. 2000;30(3):205-223.
Maenner, M.J.; et al. Prevalence of autism spectrum disorder among children aged 8 Years-Autism and developmental disabilities monitoring network, 11 Sites, United States, 2016. MMWR Surveill. Summ. 2020, 69, 1-12.

(56) References Cited

OTHER PUBLICATIONS

Mao, Q.R. et al. "Using Kinect for real-time emotion recognition via facial expressions," Front. Inf. Technol. Electron. Eng., 2015.
Matson JL, et al. Characteristics of challenging behaviours in adults with autistic disorder, PDD-NOS, and intellectual disability. J Intellect Dev Disabil. 2008;33(4):323-329.
Matson, J.L. et al. "Assessing challenging behaviors in children with autism spectrum disorders: A review." Research in Developmental Disabilities28.6 (2007): 567-579.
Matson, J.L. et al. "Reliability of the Autism Spectrum Disorder-Diagnostic for Children (ASD-DC)," Res. Autism Spectr. Disord., vol. 2, No. 3, pp. 533-545, 2008.
Matson, J. L., et al. "Progression of challenging behaviors in children and adolescents with autism spectrum disorders as measured by the Autism Spectrum Disorders-Problem Behaviors for Children (ASD-PBC)." Research in Autism Spectrum Disorders 4, No. 3 (2010): 400-404.
McGuire K, et al. Psychiatric hospital treatment of youth with autism spectrum disorder in the United States: needs, outcomes, and policy. Int Rev Psychiatry. 2018;30(1):110-115.
McHugh, M. L. (2012). Interrater reliability: The kappa statistic. Biochemia Medica, 22(3), 276-282.
Microsoft. Kinect V2. Available online: https://developer.microsoft.com/en-us/windows/kinect (accessed on Feb. 24, 2021 at https://web.archive.org/web/20210224122800/https://developer.microsoft.com/en-us/windows/kinect/) (3 pages).
Min, C.-H., et al. "Optimal sensor location for body sensor network to detect self-stimulatory behaviors of children with autism spectrum disorder." In 2009 Annual International Conference of the IEEE Engineering in Medicine and Biology Society, pp. 3489-3492. IEEE, 2009.
Morrison, D. et al. "Ensemble methods for spoken emotion recognition in call-centres," Speech Commun., vol. 49, No. 2, pp. 98-112, 2007.
Myers S.M. et al., "Management of children with autism spectrum disorders," Pediatrics, vol. 120, No. 5, pp. 1162-1182, 2007.
Newell, K.M., et al. (2002)Further evidence on the movement dynamics of self-injurious behaviorAmerican Journal on Mental Retardation, 107, 60-68.
Paquette-Smith M, et al. Predictors of health service use among adolescents and adults with autism and aggression. Research in Autism Spectrum Disorders. 2019;68:101418.
Parish, S.L. et al. "State medicaid spending and financial burden of families raising children with autism," Intellect. Dev. Disabil., vol. 50, No. 6, pp. 441-451, 2012.
Patel, A. N., et al. "A Wearable Multi-Modal Bio-Sensing System Towards Real-World Applications." IEEE Transactions on Biomedical Engineering 66, No. 4 (2019): 1137-1147.
Pedregosa, F.; et al. Scikit-learn: Machine learning in Python. J. Mach. Learn. Res. 2011, 12, 2825-2830.
Piana, S., et al. "Real-time automatic emotion recognition from body gestures." arXiv preprint arXiv:1402.5047 (2014).
Poria, S. et al. "A review of affective computing: From unimodal analysis to multimodal fusion," Inf. Fusion, vol. 37, pp. 98-125, 2017.
Poria, S. et al. "Towards an intelligent framework for multimodal affective data analysis," Neural Networks, vol. 63, pp. 104-116, 2015.
Rad, N.M.; et al. Applying Deep Learning to Stereotypical Motor Movement Detection in Autism Spectrum Disorders. In Proceedings of the 2016 IEEE 16th International Conference on Data MiningWorkshops (ICDMW), Barcelona, Spain, Dec. 12-15, 2016; pp. 1235-1242.
Richardson B, et al. Factors associated with long-term use of restrictive interventions. Journal of Intellectual & Developmental Disability. 2019:1-8.
Roane, H. S., et al. (2013). Using modified visual-inspection criteria to interpret functional analysis outcomes. Journal of Applied Behavior Analysis, 46(1), 130-146.
Rowel R, et al. Practical, Robust Implementation and Sustainability Model: The utility of the environmental scan for public health practice. Journal of the National Medical Association. Apr. 2005;97(4):527.
Saini, V., et al. (2018). Predictive validity and efficiency of ongoing visual-inspection criteria for interpreting functional analyses. Journal of Applied Behavior Analysis, 51(2), 303-320.
Sano, A. et al. "Multimodal annotation tool for challenging behaviors in people with autism spectrum disorders," UbiComp'12—Proc. 2012 ACM Conf. Ubiquitous Comput., pp. 737-740, 2012.
Sarabadani, S. et al. "Physiological Detection of Affective States in Children with Autism Spectrum Disorder," IEEE Trans. Affect. Comput., pp. 1-14, 2018.
Scruggs, T. E., et al. (1987). The quantitative synthesis of single-subject research. Methodology and validation. Remedial and Special Education, 8(2), 24-33.
Setz, C. et al. "Discriminating stress from cognitive load using a wearable eda device," IEEE Trans. Inf. Technol. Biomed., 2010.
Shriver, M.D. et al. "Evaluating the validity of functional behavior assessment," School Psych. Rev., vol. 30, No. 2, pp. 180-192, 2001.
Siddharth, et al, "A Wearable Multi-Modal Bio-Sensing System Towards Real-World Applications," IEEE Trans. Biomed. Eng., vol. 66, No. 4, pp. 1137-1147, 2019.
Sinclair, J. et al. "Digital filtering of three-dimensional lower extremity kinematics: An assessment." Journal of human kinetics 39, No. 1 (2013): 25-36.
Slaton, J.D. et al. "Interview-informed functional analyses: A comparison of synthesized and isolated components," J. Appl. Behav. Anal., 2017.
Sparrow SS, et al. Diagnostic uses of the Vineland Adaptive Behavior Scales. J Pediatr Psychol. 1985;10(2):215-225.
Sullivan M, et al. Gaining Insights into Aggressive Behaviour in AUtism Spectrum Disorder using Latent Profile Analysis. Journal of Autism and Developmental Disorders. 2019;49:4209-4218.
Sullivan, W.E. et al. "Measurement of nontargeted problem behavior during investigations of resurgence," J. Appl. Behav. Anal., 2020.
Symons FJ, et al. (2011)Salivary proteomic biomarkers of HPA axis and autonomic activity in adults with intellectual disabilities with and without self-inurious behaviorJournal of Neurodevelopmental Disorders. 3(2): 144-51.

* cited by examiner

SYSTEMS AND METHODS FOR EVALUATING AND MITIGATING PROBLEM BEHAVIOR BY DETECTING PRECURSORS

RELATED APPLICATIONS

This application claims the priority benefit of U.S. Provisional Patent Application No. 63/217,585, filed Jul. 1, 2021, entitled "PORTABLE APPLICATION TO RECORD GROUNDTRUTH OF AFFECTIVE STATES AND MULTIMODAL DATA COLLECTION SYSTEM TO PREDICT IMMINENT PRECURSOR OF PROBLEMATIC BEHAVIORS," the entire contents of which are hereby incorporated herein by reference.

STATEMENT OF GOVERNMENT INTEREST

This invention was made with government support under grant 2124002 awarded by National Science Foundation. The government has certain rights in the invention.

BACKGROUND

The present invention relates to systems and methods for evaluating and treating individuals (e.g., children and adolescents) that may exhibit problem behaviors including, for example, individuals with developmental disabilities and/or autism spectrum disorder (ASD).

SUMMARY

Autism Spectrum Disorder (ASD) is a neurodevelopmental disorder that affects 1 in every 59 children in the United States. Over two thirds of children with ASD display frequent problem behaviors (PB) that may entail physical harm to self or others, non-compliance, property destruction, and elopement. Although common in ASD, these behaviors are not limited to autism diagnoses. They also occur as part of other developmental or genetic disorders, such as intellectual disability, as well as psychiatric disorders. Precursors (PC) are signs that a PB may be imminent. If a parent or caregiver can observe the precursors of PB in time to intervene, some PB can be mitigated or prevented.

In some implementations, the systems and methods described herein provide a multimodal data capture system that gathers multi-sensory data from an individual and utilizes a trained machine-learning model to detect precursors of problem behavior based on data signals collected from a plurality of sensors and/or features extracted from the data signals. Data channels may include, for example, motion (e.g., accelerations, joint angles, gesture patterns, pose, etc.), audio (e.g., pitch, volume, speech, words, etc.), physiological signals (e.g., heart rate, body temperature, skin conductance, bio-impedance, etc.), facial expressions (e.g., happy, mouth open, eyes open, etc.), and head rotations/position.

In some implementations, the machine-learning model is trained specifically for an individual based on observed occurrences of problem behavior & precursors as well as contemporaneously captured data signals. In other implementations, a group or collective model is trained for use by a plurality of different users based on observed data and captured data signals. In some implementations, the system may include a self-monitoring application (e.g., implemented on a portable device such as a smart phone) configured to collect the data signals and apply the trained machine-learning model. In some implementations, the application may be configured to generate an output notification (e.g., text, audio, visual, etc.) configured to warn the user that he/she is showing precursor signs of problem behavior that warrant attention. In some implementations, the system may be configured to provide recommendations for mitigation (e.g., take deep breaths, temporarily step away from situation, etc.). In some implementations, other individuals (e.g., parents, caregivers, therapists, educators, etc.) may also receive a notification of the detected precursor.

In some implementations, the systems and methods described herein provide a multi-modal data collection system on precursors of problem behaviors that include multiple channels of data signals. In some implementations, the system includes a wearable motion sensor system that is feasible to such populations (e.g., a "wearable intelligent non-invasive gesture sensor" (WINGS) system for capturing motion signal data).

In some implementations, the system is configured to further train (e.g., retrain) the machine-learning model based on user indications of false positives and false negatives. For example, in some implementations, in response to the machine-learning model indicating that a precursor has been detected based on the captured signals, the system may generate a prompt to a user (e.g., the individual being monitored, a caregiver, a parent, etc.) asking the user to confirm whether a precursor actually occurred and/or whether a problem behavior resulted. Conversely, in some implementations, the software application may be configured to allow a user (e.g., the individual being monitored, a caregiver, a parent, etc.) to provide a timestamped user input indicating that an undetected precursor and/or problem behavior occurred. Based on the user feedback, the system is configured to identify a set of captured data signals corresponding to the time of the user input and to retrain the machine-learning model to associate the set of captured data signals with a precursor (in the event of a false negative) and/or to retrain the machine-learning model to no longer associate the set of captured data signals with the precursor (in the event of a false positive).

In some implementations, the systems and methods described herein provide a mechanism for training the machine-learning model based, for example, on data signals collected during administration of an evaluation analysis session for the individual. For example, the interview-informed synthesized contingency analysis (IISCA) is one approach used for the assessment of children and adolescents with problem behaviors. The IISCA includes a controlled series of experimental trials in which the relation between a child's problem behavior and the environment is verified through the structured presentation of alternating preferred and then non-preferred situations. In some implementations, the system described herein provide a software-based application for use by a behavior analyst during an IISCA via which the behavior analyst records behaviors and affective states of the individual undergoing the IISCA. For example, in some implementations, the software application is configured to enable the behavior analyst to indicate observed information such as (1) occurrences of problem behavior, (2) occurrences of precursors, and (3) confirmation that the subject is "calm."

In some implementations, the subject individual is asked to wear the multi-modal data capture system while undergoing the IISCA (or other behavior analysis protocol). The collected data from the multi-modal data capture system is timestamped and stored on a memory (e.g., a local memory or a cloud storage system). Concurrently, information from the software application indicating observed occurrences of problem behavior, precursors, and calm demeanor are also timestamped and stored. The system is then configured to train the machine-learning model by associating sets of data signals with the corresponding behavior state (e.g., which data signals are associated with precursors, which are associated with problem behaviors, and which are associated with a calm state).

In some implementations, the multi-modal data capture system and the trained machine-learning model are configured to detect precursors to problem behavior. In this manner, the system is configured to detect/predict that the conditions for problem behavior are present and that, without intervention/mitigation, the problem behavior is likely to occur imminently. However, the system is configured to detect the precursors before the problem behavior actually occurs so that, in some cases, the problem behavior might be preventable.

In some implementations, the multi-modal data capture system includes a wrist-worn device (configured to sense physiological signals), a microphone (configured to detect words, sounds, patterns, etc.), and a non-invasive set of gesture sensors (e.g., inertial measurement units (IMUs) configured to capture data that can be used to reconstruct/model the upper body pose and movements (e.g., a child that begins to flail their arms around may be a precursor)). In some implementations, the microphone is selectively attachable to a garment worn by the subject individual. In other implementations, the microphone and/or other sensors may be integrated into a piece of clothing worn by the subject individual. For example, in some implementations, an upper body garment (e.g., a shirt, a sweatshirt, a vest) is configured with a series of pockets positioned at different locations. Each pocket is sized and positioned to non-invasively hold an inertial measurement unit. Similarly, in some implementations, the microphone may be integrated into the garment itself (e.g., in the hood of a hooded sweatshirt) so that it does not need to be worn or attached to the subject individual separately.

In one embodiment, the invention provides a system for predicting problem behavior in individuals with developmental and behavior disabilities. A wearable upper body motion sensing device includes a plurality of inertial measurement units (IMUs) positioned at known positions relative to each other. An electronic controller is configured to receive output signals from each of IMUs and to model an upper body position of the subject individual based on the output signals from the IMUs. A trained machine-learning model is then applied by providing an input data set that includes signal data from at least one IMU, the modeled upper body position information, and/or a sequence of upper body position information. The machine-learning model is trained to produce as output an indication of whether a precursor to the problem behavior is detected and, in response to detecting the precursor, a notification (or alarm) is generated.

In some implementations, the system is configured to receiving multimodal data captured by the wearable upper body motion sensing device and other sensor systems including, for example, physiological data, audio data, and/or video data. In some implementations, the input data set further includes data signals from one or more of the other sensors systems and/or features extracted from the data signals from the one or more of the other sensor systems.

In another embodiment, the invention provides a method of training the machine-learning model to be used to detect precursors to the problem behavior. The subject individual is equipped with the wearable upper body motion sensing device (and, in some implementations, one or more additional sensor systems to generate multimodal training data). A behavior assessment (e.g., the IISCA) is administered to the subject individual while recording signal data from the plurality of inertial measurement units. Concurrently, user inputs are received through a computer-based user device while the behavior assessment is administered. The user inputs provide real-time indications of observed occurrences of the problem behavior and observed occurrences of the precursor. A set of training data is then generated by defining a plurality of ground truth labels based on the received real-time indications of observed occurrences of the problem behavior and the observed occurrences of the precursor. Each real-time indication is mapped to recorded signal data form the plurality of inertial measurement units. The machine-learning model is then trained, based on the set of training data, to produce an output corresponding to the ground truth label in response to receiving as input the signal data mapped to the ground truth label, upper body position information determined based on the signal data mapped to the ground truth label, and/or a sequence of upper body position information determined based on the signal data mapped to the ground truth label.

Other aspects of the invention will become apparent by consideration of the detailed description and accompanying drawings.

DETAILED DESCRIPTION

Figure 1:
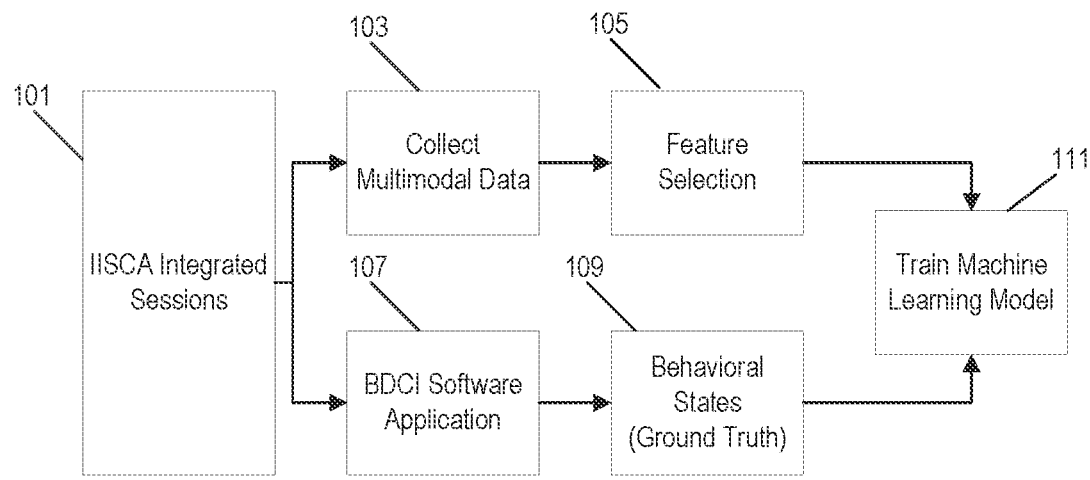
FIG. 1 is a flowchart of a method for training a machine-learning model to detect precursors of problem behavior in a subject individual (e.g., an individual with developmental disabilities (IDD)).

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

FIG. 1 illustrates an example of a framework for developing a machine-learning model trained to associate multi-modal signal data with precursors to problem behavior as a mechanism for anticipating problem behaviors before they occur. In the example of FIG. 1, training data for the machine-learning model is generated in the context of an Interview Informed Synthesized Contingency Analysis (IISCA). IISCA is a type of practical functional assessment (PFA). IN this assessment, a behavior analyst methodically manipulates the environment to test caregiver hypotheses around what environmental stimuli serve as antecedents or establishing operations (EOs) to a problem behavior, and which stimuli serve as reinforcers to the problem behavior. During the assessment, the subject (e.g., IDD) interacts with a behavior analyst and/or therapist and receives behavioral reinforcement.

During the IISCA session (step 101), a multi-modal data capture system operates to collect multi-modal data indicative of the subject's response to stimuli (step 103). As described in further detail below, in some implementations, the multi-modal data capture system is configured to capture data such as, for example, physiological signals, motion signals, pose signals, audio signals, and/or facial expression data. The captured multi-modal data is then processed for feature selection (step 105). For example, captured video data may be processed to identify/categorize facial expressions by type, the physiological signals may be processed to quantify a heart rate, the motion signals may be processed to determine a pose and/or body gesture of the subject, and the audio signal may be processed to identify changes in pitch and/or specific words used by the subject.

While the multi-modal data capture system operates to collect the multi-modal data, the behavior analyst observes the subject and, using a software-based application (as described in further detail below) (step 107), records observations regarding the behavioral state of the subject including, for example, when problem behaviors are observed, when precursors are observed, and when the subject appears calm (step 107). These recorded behavioral states are time-stamped and then associated with features extracted from the multi-modal data to form the set of training data. The observed behavioral states serve as the "ground truth" (step 109) for the temporally corresponding multi-modal data and/or extracted features while training the machine learning model (step 111). The machine-learning model is trained by mapping the features extracted form the multi-modal data against the ground truth so that, in response to receiving a set of input data (including, for example, the multi-modal data and/or features extracted from the multi-modal data), the machine-learning model produces an output indicative of whether a precursor behavior is detected which would indicate that an occurrence of problem behavior is imminent if not mitigated.

The example of FIG. 1 (and other examples discussed herein below) describe training the machine-learning model in the context of an IISCA session. However, in other implementations, other types of behavior assessment protocols may be used to generate ground truth behavioral state observations while multi-modal data is captured. Furthermore, in some implementations, the system is configured to train the machine-learning model specifically to map extracted features to the ground truth behavioral state while, in other implementations, the system may be configured to train the machine-learning model based on the (raw or filtered) multi-modal data signals themselves and/or a combination of extracted features and signals from the set of multi-modal data signals. Similarly, in some implementations, the machine-learning model is trained to map features/signals specifically to observed precursors that are flagged by the behavior analyst as "precursors." However, in other implementations, the system is additionally or alternatively configured to respond to observed occurrences of problem behavior by analyzing the features/signals preceding the occurrence of the problem behavior to attempt to discern signals, features, or combinations thereof that can be indicative of a "precursor" to the problem behavior—even if the subject did not exhibit any observable "precursor" behavior. In this manner, the machine-learning model can be trained to detect precursors to problem behavior that may not be visually observable by a behavior analyst.

Figure 2:
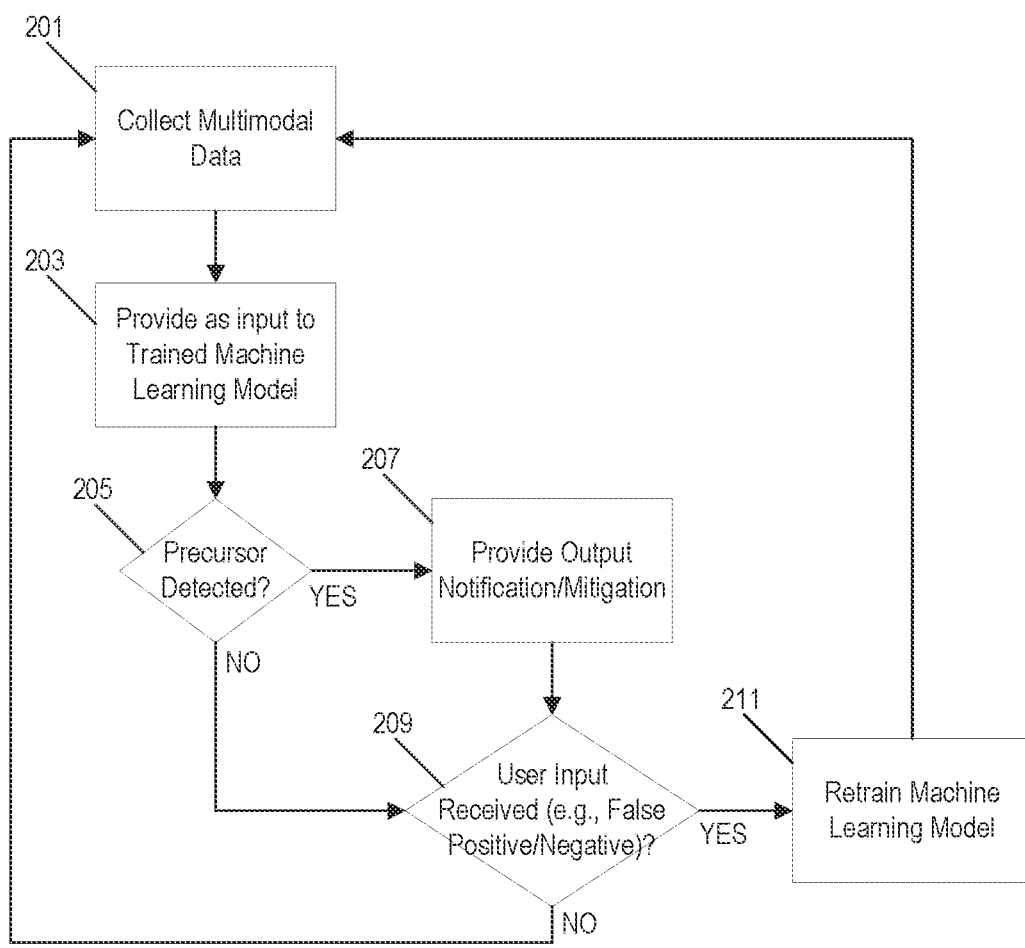
FIG. 2 is a flowchart of a method for applying the trained machine-learning model of FIG. 1 to detect precursors of problem behavior based on data signals captured by a multi-modal data capture system.

FIG. 2 illustrates an example of a method, executed by a computer-based system and the multi-modal data capture system, for detecting precursors and predicting imminent problem behavior in a subject based on the trained machine-learning model. The multi-modal data capture system collects multi-modal data streams (step 201) and sets of the multi-modal data and/or features extracted from the multi-modal data are provided as input to the trained machine-learning model (step 203). If the output of the machine-learning model indicates that a precursor is detected (step 205), the system generates an output notification and/or mitigation to attempt to prevent the problem behavior from occurring (step 207).

In some implementations, the system is configured to respond to a detected precursor by generating an audio and/or visual notification, for example, on a device such as a smart phone, tablet computer, or computer workstation. In some implementations, the system can be configured to generate the notification on the devices associated with one or more different users. For example, in some implementations, the system is configured to generate the notification on devices associated with the subject/patient, the behavior analyst/therapist, a parent, a caregiver, and/or an educator. In some implementations, the system may be configurable to allow the user to indicate which users are to receive the notifications.

Additionally or alternatively, in some implementations, the system may be configured to initiate an action to attempt to mitigate the problem behavior (i.e., the prevent the problem behavior from occurring). For example, the system may be configured to automatically launch a software application on the portable device of the subject/patient initiating breathing exercises to attempt to calm the subject/patient. In other implementations, the system may be configured to include a recommended action in the notification displayed to the user. For example, the system may generate a notification indicating that a precursor has been detected and recommending that the subject step away from the situation for a period of time to calm down. In still other implementations, the system may be configured to initiate some form of actuators to perform an automated system task in response to detecting the precursor. Finally, in some implementations, the system may be configured to perform the same notification/mitigation whenever a precursor is detected. However, in other implementations, the machine-learning model may be trained to identify a specific type or category of precursor and the system may be configured to perform a different type of notification/task based on the type/category of the detected precursor.

Returning to the example of FIG. 2, in some implementations, the system is configured to generate updated training data based on user-provided feedback regarding occurrences of false positives and/or false negatives. For example, if the system generates a notification indicating that a precursor has been detected, but a user observing the subject (e.g., a parent, caregiver, or the subject themselves) disagrees with the assessment or, for example, if no problem behavior occurs after the machine-learning model detects the alleged precursor, the user may provide a user input via a user interface (e.g., of a software application) indicating a false positive. Conversely, if a problem behavior is observed in the subject without the machine-learning model first detecting a precursor, the user may provide a user input via the user interface indicating a false negative. In response to receiving one or more user inputs indicative of false positives or false negatives (step 209), the system will retrain the machine-learning model (step 211) based on the captured multi-modal data and/or the extracted features using the user input as the ground truth for the new training data. In some implementations, this retraining is performed periodically after expiration of a time interval while, in some implementations, the machine-learning model is retrained in response to capturing a threshold amount of new training data (e.g., a threshold number of false positives and/or false negatives). In some implementations, the retraining is performed when the multi-modal data capture system is not in use.

Figure 3:
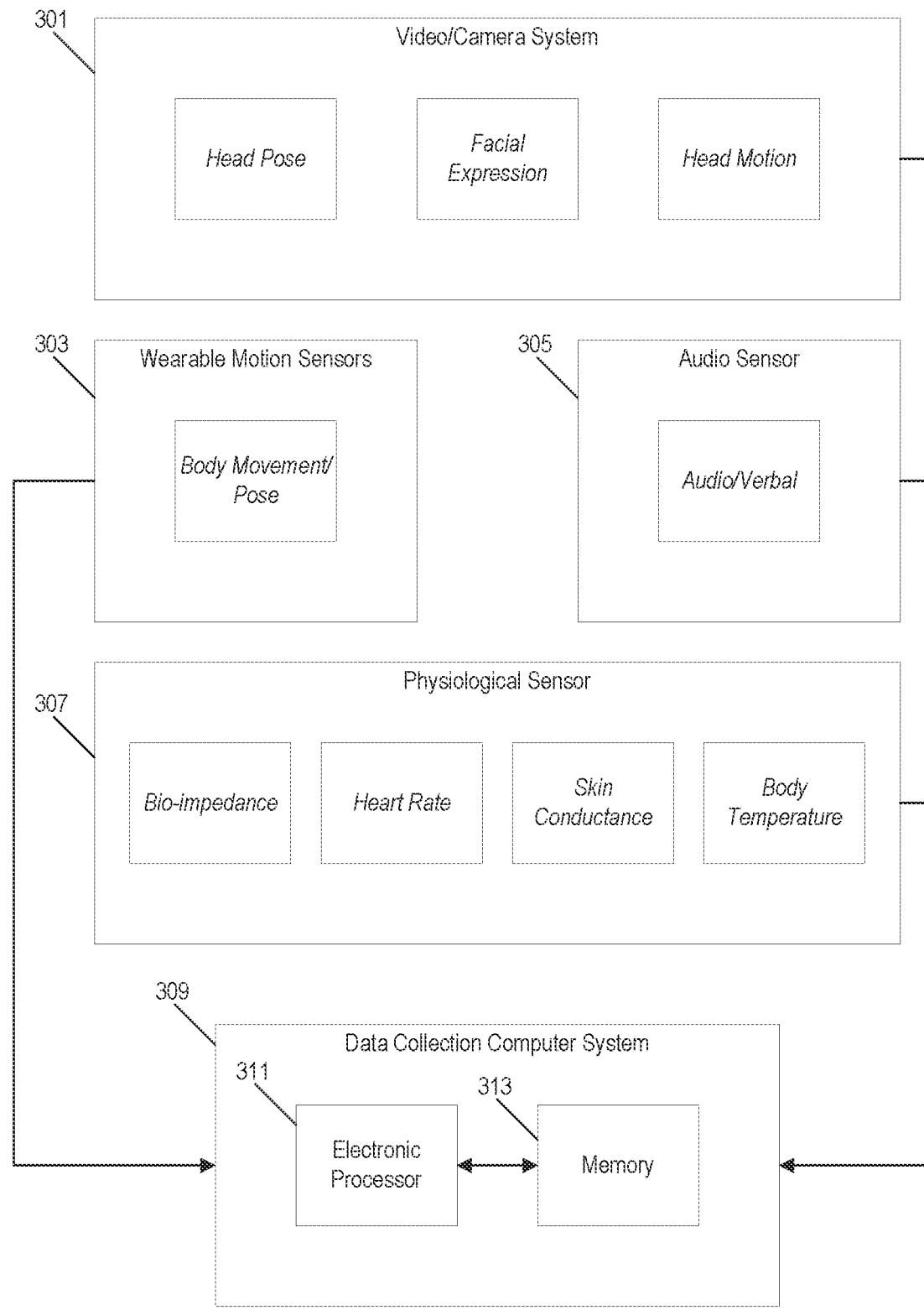
FIG. 3 is a block diagram of the multi-modal data capture system used in the method of FIG. 2 according to one implementation.

FIG. 3 illustrates an example of a multi-modal data capture system. The system of FIG. 3 integrates and synchronizes multiple data modalities of different time scales. The system includes one or more video/camera based systems 301, a system of wearable motion sensors 303, one or more audio sensors 305, and one or more physiological sensors 307. In some implementations, the data captured by the video/camera-based system 301 is processed to extract features such as, for example, head pose, facial expression, and head motion. In some implementations, the data captured by the system of wearable motion sensors 303 is processed to extract features such as, for example, body movements and body pose. In some implementations, the data captured by the audio sensor 305 is processed to extract features such as, for example, individual words and phrases, changes in verbal pitch, and changes in volume of the subject's voice. In some implementations, data captured by the physiological sensor 307 is processed to extract features such as, for example, bio-impedance, heart rate, skin conductance, and body temperature.

In the example of FIG. 3, the sensor systems are communicatively coupled to a data collection computer system 309. The data collection computer system 309 includes an electronic processor 311 and a non-transitory, computer-readable memory 313. The memory 313 stores data and computer-executable instructions that, when executed by the electronic processor 311, provide the functionality of the data collection computer system 309—including, for example, the functionality described herein. In some implementations, the data signals collected by the various sensor systems are transmitted to the data collection computer system 309 and stored to the memory 313. In some implementations, the data collection computer system 309 receives the collected multi-modal data signals and stores the data in a cloud-computing environment. In some implementations, the data collection computer system 309 is configured to analyze the collected data signals and to perform feature extraction. Similarly, in some implementations, the data collection computer system 309 is configured to apply the trained machine-learning model by providing a set of input data (including, for example, some or all of the collected data signals and/or features extracted from the data signals) as input to the trained machine-learning model and then taking appropriate action (e.g., generating notifications to the appropriate devices) in response to the machine-learning model generating an output indicative of a detected precursor.

The multi-modal data collection system of FIG. 3 is only one example. In other implementations, the multi-modal data collection system may include other sensor systems in addition to or instead of those illustrated in the example of FIG. 3. Conversely, in some implementations, the multi-modal data collection system may include only some, but not all of the sensor systems illustrated in the example of FIG. 3. For example, in some implementations, the multi-modal data collection system may include a set of wearable motion sensors 303, an audio sensor 305, and a physiological sensor 307, but does not include or utilize video/camera data. Similarly, the example of FIG. 3 illustrates a set of examples of types of features that may be extracted from the captured multi-modal data. However, in other implementations, the system may be configured to extract more, fewer, and/or different features from the multi-modal data.

In some implementations, the video/camera-based system 301 includes a stereoscopic camera system such as, for example, a Microsoft Kinect V2 device. In the example of FIG. 3, the Microsoft Kinect V2 device is configured to detect the facial expressions and head rotations of the subject. The Microsoft Kinect API computes positions of eyes, nose and mouth among different points on the face from its color camera and depth sensor to recognize facial expressions and compute head rotations. In some implementations, the API is integrated with the software executed by the data collection computer system 309 to read these measurements in C# scripts. In some such implementations, the system is designed to track a first subject that enters the field of view of the Kinect device and detected facial expressions are assigned to one of a plurality of different predetermined categories including, for example, "happy," "eyes closed," "mouth open," "looking away," and "engaged." All the measures are computed in real-time and vary on a discrete numerical scale that ranges from 0, 0.5 and 1, meaning no, probably, and yes, respectively. The head rotations are measured in terms of roll, pitch and yaw angles of the head. The sampling rates of the head rotations and facial expressions are both 10 Hz and the signals are recorded with time stamps with millisecond precision. The Kinect is placed on the wall by a 3D printed structure which can adjust the pan and tilt angles of the Kinect so that it directly faces the child during observation.

In some implementations, the physiological sensors 307 are implemented as a wrist-worn device configured with a plurality of sensors/electrodes—for example, an E4 wristband. In some implementations, the wristband itself is non-invasive and looks like a smart watch. The sampling rates used by the wrist-worn device to measure blood volume pulse (BVP) and electrodermal activity (EDA) are 64 Hz and 4 Hz, respectively. In some implementations, the wrist-worn device also includes an integrated contact temperatures sensor configured to measure body temperature when the sensor is in contact with the skin surface of the subject. In some implementations, wrist-worn device includes an electronic controller and a wireless transceiver. The electronic controller of the wrist-worn device is configured to record the sensed data with precise time stamps. The real-time physiological data stream is transferred to the data collection computer system 309 via the wireless transceiver.

Figure 4:
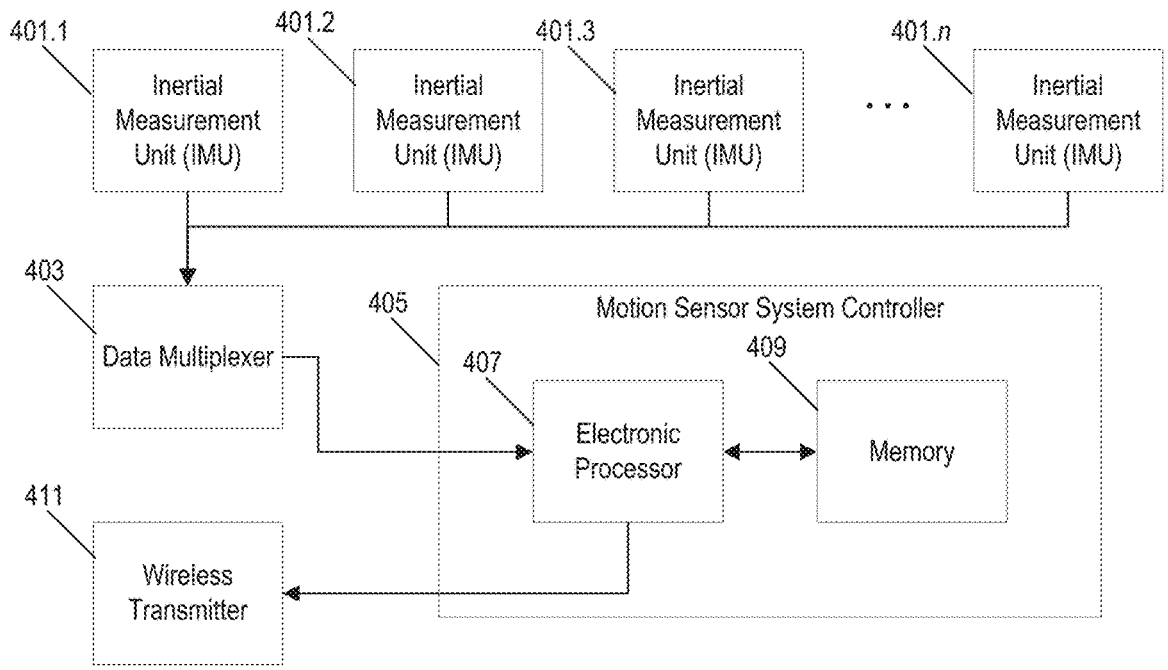
FIG. 4 is a block diagram of a wearable non-invasive gesture sensor system according to one implementations.
Figures 5A, 5B, 5C:
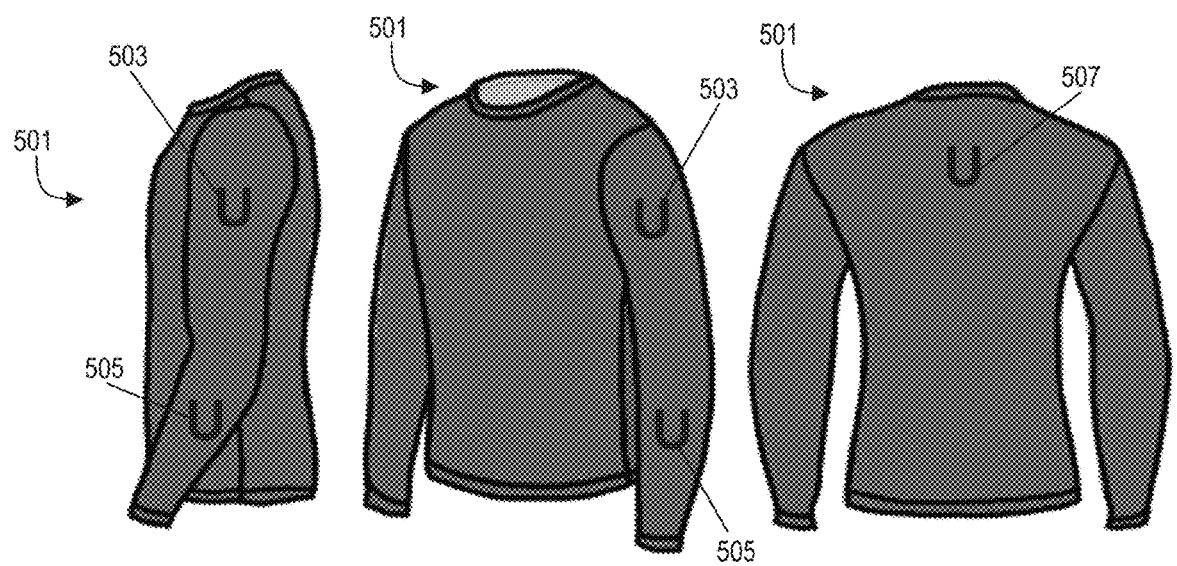
FIGS. 5A, 5B, and 5C are different perspective views of a wearable garment configured to hold the inertial measurement units of the system of FIG. 4 during use.

In some implementations, the wearable motion sensors 303 are integrated into a wearable garment and can thereby non-invasively measure body movements and poses when the garment is worn by the subject. FIGS. 4 through 5C illustrates an example of a body movement tracking system (i.e., a "wearable intelligent non-invasive gesture sensor" or "WINGS"). The body movement tracking system is a portable, non-invasive tool for measuring upper body motion. The body movement tracking system integrates a plurality of inertial measurement units (IMUs) into a wearable garment such as, for example, a sweater, a shirt, or a vest that resembles clothing that the subject is comfortable wearing. To increase the likelihood that the platform will be tolerated by children with varying levels of activity, sensory sensitivity, and cognitive functioning, the device focuses on comfort, concealment, robustness, and safety.

FIG. 4 illustrates an example of the electronic components of the body movement tracking system. A plurality of inertial measurement units (IMUs) 401.1, 401.2, 401.3, ... 401.n are positioned at locations along the arms and back of the subject. Each IMU 401 is configured to measure acceleration and magnetic field in three-dimensions. As described in further detail below, the IMUs 401 are positioned at strategic locations on the arms and torso of the subject such that the data collection computer system 309 can determine relative position and angles of the body segments in order to generate a model of body movement and position based on the output signals from the plurality of IMUs 401. In some implementations, the body movement tracking system includes a total of seven IMUs 401 to measure joint angles of each forearm, upper arm, and the back. However, in other implementations, the body movement tracking system may include more or fewer IMUs 401.

Each IMU is wiredly coupled to a data multiplexer 403 that is configured to search and loop through the connected IMUs 401 and to periodically couple each IMU 401 to the data input channel of a motion sensor system controller 405. The motion sensor system controller 405 includes an electronic processor 407 and a non-transitory, computer-readable memory 409. The motion sensor system controller 405 is configured to send the motion data via a wireless transmitter 411 to a wireless received of the data collection computer system 309.

FIGS. 5A through 5B illustrate an example of a garment configured for use with the body movement tracking system of FIG. 4. The garment 501 is a sweatshirt equipped with an upper arm pocket 503 and a forearm pocket 505 on each arm and at least one back pocket 507 on the back. The pockets 503, 505, 507 are each sized to hold an individual IMU 401 and, in some implementations are selectively closable with hook-and-loop fasteners positioned along the opening of each pocket 503, 505, 507. In other implementations, the pockets 503, 505, 507 are sewn shut. The garment 501 is designed such that the pockets 503, 505, 507 are discrete and do not stand out. The data multiplexer, the motion sensor system controller 405, and the wireless transmitter 411 are also integrated into the garment 501 (e.g., in a hood of a hooded sweatshirt or in another pocket). In some implementations, a microphone (e.g., audio sensor 305) is also integrated into the garment 501 (for example, along the neck of the garment 501).

From the accelerometer readings ($accl_x$, $accl_y$ and $accl_z$) and the magnetometer readings ($mag_x$, $mag_y$ and $mag_z$) output from each of the IMUs 401, the data collection computer system 309 is able to compute the roll, pitch and yaw angles ($\theta$, $\psi$, $\phi$) of the torso and limbs according to equations (1), (2) and (3). The roll and pitch angles are computed by the IMU orientations with respect to the gravitational direction. The yaw angle can be computed by the relative IMU orientations with respect to the earth magnetic field.

$$\theta = \tan^{-1}\left(\frac{accl_y}{\sqrt{accl_y^2 + accl_z^2}}\right) \quad (1)$$

$$\psi = \tan^{-1}\left(\frac{accl_x}{\sqrt{accl_y^2 + accl_z^2}}\right) \quad (2)$$

$$\phi = \tan^{-1}\left(\frac{mag_z s\psi - mag_y c\theta}{mag_x c\theta + mag_y s\theta s\psi + mag_z c\psi s\theta}\right) \quad (3)$$

Figure 6:
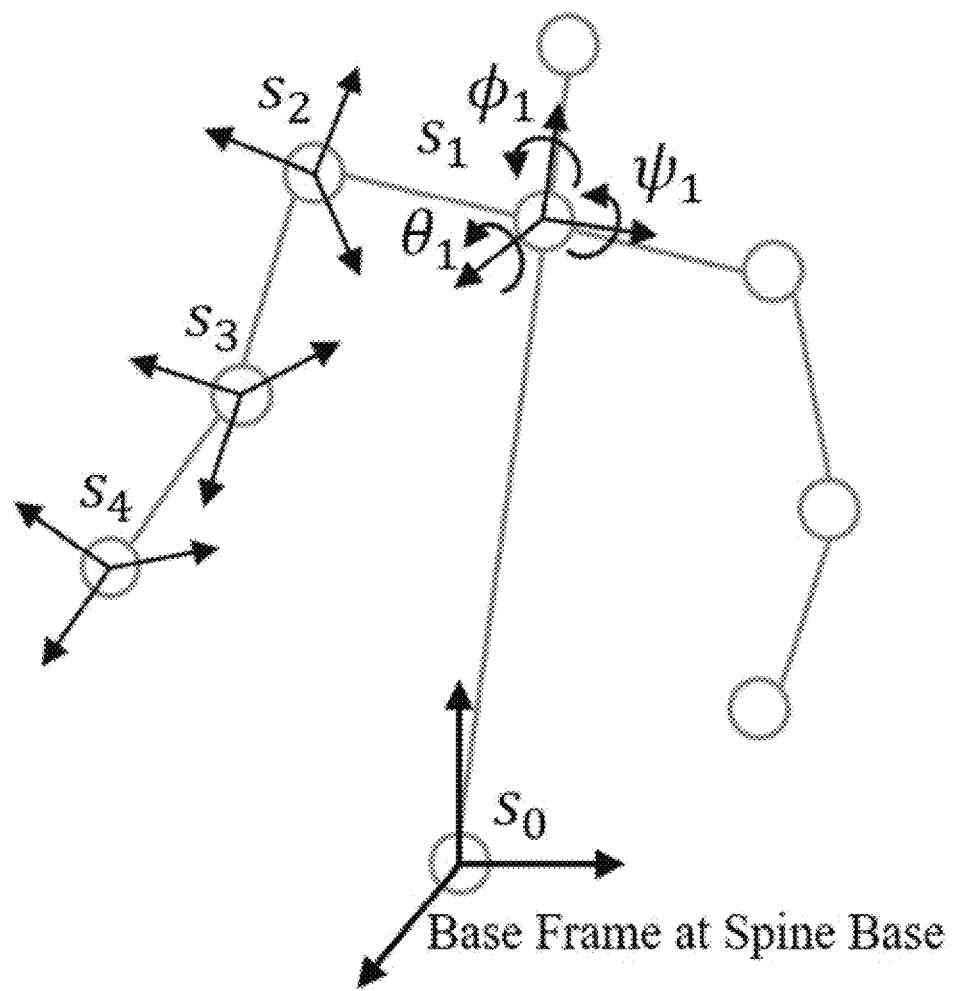
FIG. 6 is an example of a graphical model of pose and movement of a subject individual recreated based on data signals captured by the inertial measurement units of the system of FIG. 4.

With the roll, pitch and yaw angles of different joints, data collection computer system 309 then computes the 3D positions and orientations of each joint using forward kinematics. As shown in FIG. 6, the base frame is set at the spine base of the subject. The base frame positive directions of the x, y and z axes are front, left directions of the subject and up, respectively. Then coordinate frame $s_n$ is attached to each body joint. Homogeneous transformation matrices $H_{Joint\ n}^{Joint\ n-1}$ between the nth joint and the last joint consist of two parts, a 3-by3 rotation matrix $R_n^{n-1}$ and a 1-by-3 translation vector $d_0^{n-1}$. The rotation and translation matrices can align and move the previous coordinate frame to the current coordinate frame, respectively. The rotation matrix is computed by roll, pitch and yaw angles while the translation vector is computed by the body link lengths which are manually measured from different sizes of garments 501 (or measured separately for the specific individual subject). Each homogeneous transformation matrix is computed as equation (4). Then the overall homogeneous transformation matrix $H_{Joint\ n}^{Origin}$ between the base frame and the nth frame can be computed by multiplying all the homogeneous transformation matrices as in equation (5). From this matrix, $d_n^0$ can be read and that is the 3D position of the nth joint position with respect to the base frame.

$$H_{Joint\ n}^{Joint\ n-1} = \begin{bmatrix} R_n^{n1} & d_0^{n-1} \\ \vec{0} & 1 \end{bmatrix} = \begin{bmatrix} R_{x,\psi}R_{y,\theta}R_{z,\phi} & d_0^{n-1} \\ \vec{0} & 1 \end{bmatrix} = \quad (4)$$

$$\begin{bmatrix} c\phi_n c\theta_n & c\phi_n s\theta_n s\psi_n - s\phi_n c\psi_n & s\phi_n s\psi_n + c\phi_n s\theta_n c\psi_n & x_n^{n-1} \\ s\phi_n c\theta_n & s\phi_n s\theta_n s\psi_n + c\phi_n c\psi_n & s\phi_n s\theta_n c\psi_n - c\phi_n s\psi_n & y_n^{n-1} \\ -s\theta_n & c\theta_n s\psi_n & c\theta_n c\psi_n & z_n^{n-1} \\ 0 & 0 & 0 & 1 \end{bmatrix}$$

$$H_{Joint\ n}^{Origin} = \quad (5)$$

$$H_{Joint\ 1}^{Origin} \Box H_{Joint\ 2}^{Joint\ 1} \cdots H_{Jo\ intn}^{Jo\ intn-1} = \begin{bmatrix} R_1^0 & d_1^0 \\ \vec{0} & 1 \end{bmatrix} \cdots \begin{bmatrix} R_n^{n-1} & d_n^{n-1} \\ \vec{0} & 1 \end{bmatrix} = \begin{bmatrix} R_n^0 & d_n^0 \\ \vec{0} & 1 \end{bmatrix}$$

Figure 7B:
FIG. 7B is a perspective view of the subject individual posed in the position corresponding to the graphical model of FIG. 7A.
Figure 7A:
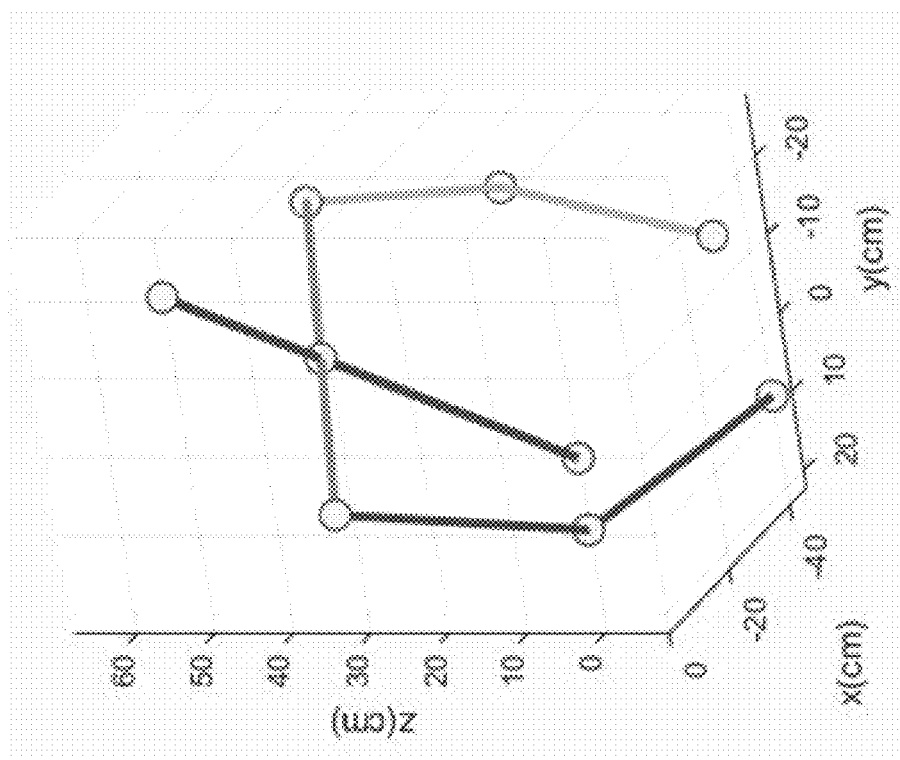
FIG. 7A is another example of a graphical model of a pose of a subject individual.

Thus, we have the 3D positions of each body joint and we can construct and visualize body gestures. In some implementations, a software program (e.g., a MATLAB program) is configured to visualize the upper body gestures in real time. A comparison of a visualized gesture and a corresponding photograph of the subject is shown in FIGS. 7A and 7B. The lines in FIG. 7A represent body limbs while the dots represent body joints.

As described above in reference to FIG. 1, the machine-learning model that is used to detect precursors is trained during performance of a behavioral assessment protocol such as, for example, the IISCA. The IISCA usually requires observers to record the occurrence of precursors of problem behaviors by paper and pen while timestamping events via a stopwatch in order to record the conditions under which target behaviors were observed. This method requires significant attention on the part of the behavioral analyst and is limited in precision with regard to recording the onset time of precursors.

Figure 8:
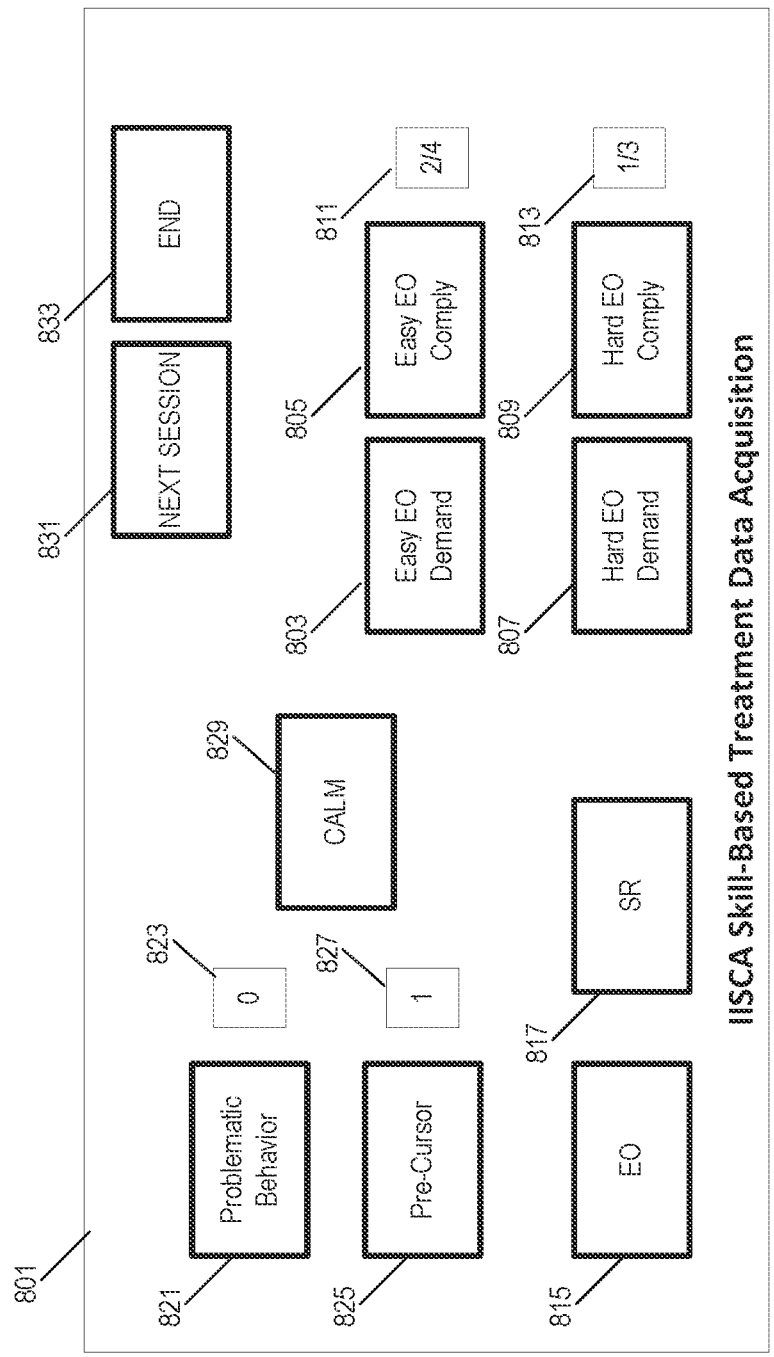
FIG. 8 is a screenshot of a graphical user interface of a software-based application for recording behavior observations during an IISCA.

FIG. 8 illustrates an example of a graphical user interface for a software application configured to be used by a behavioral analyst observing the IISCA. In particular, the software application is designed to be run on a portable device such as, for example, a tablet computer. The software application includes three different operating modes: Initialization, Session Information, and Summary. The graphical user interface 801 illustrated in FIG. 8 is for use during the "Session Information" phase. In some implementations, other graphical user interface pages are displayed during the Initialization and Summary phases while, in other implementations, relevant information for the Initialization and Summary phases may be displayed in different windows (e.g., pop-up windows).

During the IISCA, there are two therapist-imposed conditions within the assessment protocol: establishing operations (EO) and reinforcing stimulus (SR). Establishing Operations (EO) represent those antecedent conditions reported to evoke behavioral escalation by care givers. Reinforcing Stimulus (SR) (or "Synthesized Reinforcement") represent intervals in which antecedent conditions are arranged to prevent, de-escalate, and restore a state of happy and relaxed engagement in the subject.

The graphical user interface 801 for the Session phase includes several buttons relating to observer actions and observed subject behaviors. A series of buttons are provided to provide an interface for assessing the establishing operations and the response of the subject. For example, the behavioral analysts presses the "Easy EO Demand" button 803 when an "easy" EO demand is initiated and presses the "Easy EO Comply" button 805 when the subject complies with the EO demand. Similarly, a "Hard EO Demand" button 807 is pressed with a more difficult/challenging EO demand is initiated and the "Hard EO Comply" button 809 is pressed when the subject is observed as complying with the EO demand. The graphical user interface 801 also includes numeric fields 811, 813 displaying the number of EO conditions under which the subject has successfully complied without exhibiting the problem behavior. The graphical user interface 801 also allows the behavioral analyst to toggle between the two conditions (i.e., move between establishing operations and reinforcing stimulus) by clicking the EO button 815 or the SR button 817 (as described in further detail below).

The graphical user interface 801 also provides a series of buttons via which the behavior analyst can record observations of the behavioral state of the subject. A "Problematic Behavior" button 821 is to be pressed when problem behavior is observed and a numeric field 823 indicates the number of occurrences of the problem behavior during the current IISCA session. Similarly, a "Pre-Cursor" button 825 is to be pressed when precursor behavior is observed and a corresponding numeric field 827 indicates the number of occurrences of precursor behavior during the current IISCA session. A "CALM" button 829 is to be pressed to indicate when the subject is observed to be in a "calm" behavioral state (i.e., no problem or precursor behaviors).

Finally, a "NEXT SESSION" button 831 is provided to be pressed by the user at the end of each IISCA session and an "END" button 833" is provided to be pressed to when all IISCA sessions are completed for the subject. As described further below, pressing the "NEXT SESSION" button 831 causes the software application to generate and display summary data for the individual IISCA session and pressing the "END" button 833 causes the software application to generate and display summary data for all of the IISCA sessions and closes the "Session" graphical user interface 801.

Figure 9:
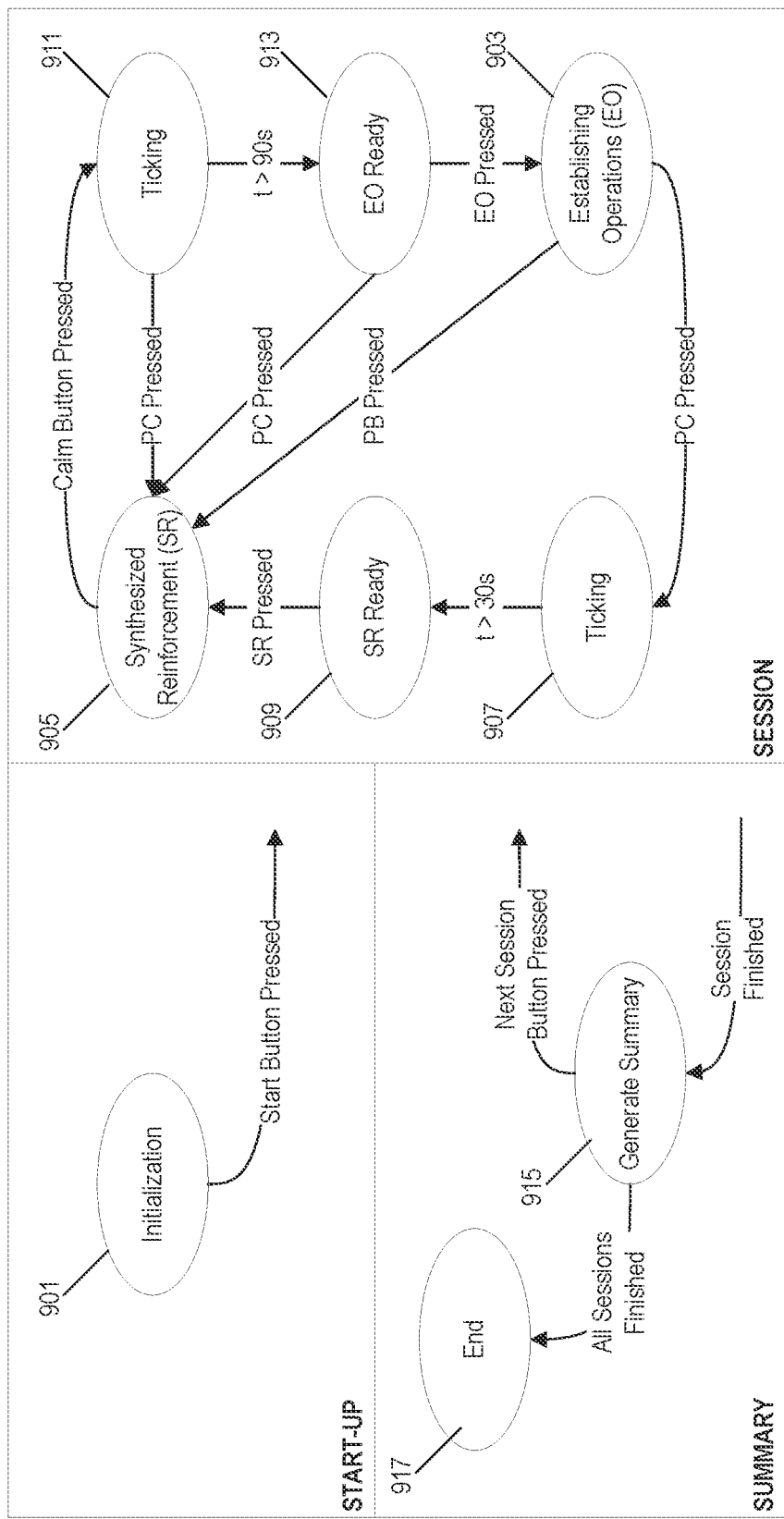
FIG. 9 is a state-diagram of the operation of the software-based application of FIG. 8.

In some implementations, the software application operates as a finite state machine (FSM) that captures the IISCA protocol as illustrated in FIG. 9. The software application starts in the initialization state 901. After entering the appropriate session and subject information through the graphical user interface, the user presses a "Start" button and the software application proceeds to the Synthesized Reinforcement (SR) phase 905. The software application remains in the SR phase 905 until the user presses the CALM button 829 indicating that the subject is observed to be in a calm behavioral state. In response to the pressing of the CALM button 829, the software application moves to a ticking phase 911 in which a timer monitors to make sure that the child is truly happy, relaxed, and engaged for at least 90 continuous seconds. After expiration of the 90 second timer, the software application moves to an EO Ready phase 913 in which the graphical user interface 801 indicates that the establishing operations conditions may be applied. In some implementations, this is indicated by displaying the EO Button 815 in a different color (e.g., green when in the EO Ready phase 913 and red when in the Ticking phase 911).

If precursor behavior is observed (e.g., as indicated by a user pressing the Pre-Cursor button 825) while in the ticking phase 911 or the EO ready phase 913, the software application returns to the SR phase 905. Otherwise, if the user presses the EO button 815 while the software application is in the EO Ready phase 913, the software application moves into the Establishing Operations (EO) phase 903. Upon pressing the EO button 815, the behavior analyst and/or a therapist are to begin the applicable Establishing Operation. While operating in the EO phase 903, if the precursor button 825 is pressed, a precursor event is recorded (with a timestamp) and the software application moves into a second ticking phase 907 in which a 30 second countdown is provided before the software application moves into an SR Ready phase 909 and provides an indication via the graphical user interface of readiness for the SR condition.

The software application guides the user (e.g., the behavior analyst) between the EO state and the SR state in this way until the assessment session is finished. When each individual assessment session is completed, the software application moves into a "generate summary" phase 915. If more sessions are to be conducted, the user presses the "Next Session" button 831 and the software application returns to the SR phase 905 for the next session. When all sessions are competed, the user presses the END button 833 and the software application moves into the end phase 917.

In order to collect training data, a pilot study was conducted with 7 children with ADS aged 10 to 15 years old (6 boys, 1 girl; mean age=12.20 years, SD=1.37). The protocol was reviewed and approved by the Institutional Review Board (IRB) at Vanderbilt University. The research team members explained the purpose, protocols, and any potential risks of the experiment to both the parents and the children and answered all their question before seeking informed consent from the parents and informed assents from the children. Because the purpose of the study was to evoke and respond to precursor to problem behaviors and prevent escalation to dangerous problem behaviors, parents and a dedicated behavior analyst data collector observed the assessment sessions to ensure that all precursors and problem behaviors as well as the target affect of happy, relaxed, and engaged were correctly recorded. All participants completed all of their experiments.

The pilot study was conducted in a child-proof room having two compartments: an experimental space and an observation space. The child sits in the experimental space with a BCBA (Board certified behavioral analyst). The seat for children is 2 meters away from the Kinect and a video camera. The child wears an E4 sensor on the non-dominant wrist and the body motion sensor system of FIG. 4 on the upper body. Four observers including an engineer, one of the parents, a behavior data collector and a behavior assessment manager are seated in the observation space, which has a one-way mirror towards the experimental space. The observers and the parent can see the therapist and the child, but not the other way around.

The child is first invited to the experimental space by the therapist. Then we close the door between the two spaces. The therapist puts the E4 sensor on the wrist of the child and helps him or her wear the body motion sensor garment 501. Meanwhile, the parent and the other observers enter the observation room. Afterwards, the Kinect calibration is performed when the therapist is out of the view of the Kinect. Therefore, the Kinect recognizes the body ID of the child and only tracks data from the child. The therapist will be recognized as a different body ID and therefore does not interfere with the data collection. Each experiment lasted for approximately one hour.

The experiment followed a modified version of the IISCA protocol. We conducted multiple therapeutic sessions in a single experiment visit to capture data on different behavioral states. These sessions are labeled as control (C) and test (T). The sessions are structured as CTCTT, which is a classical design for single subject research. The control sessions contain only SR conditions and the test sessions alternate between EO and SR presentations. EO is followed by SR and EO is applied once again after at least 30 seconds have elapsed during which the children stay calm. During EO presentations, the therapist simulates the antecedent conditions that were most likely to evoke precursors and problem behaviors. These tasks were reported by parents in the open-ended interview and include asking them to complete homework assignments, withdrawing preferred attention, and removing preferred toys or electronics. During SR condition presentations, the therapist offers free access to their favorite toys and electronics, removes all demands of letting them work and the work-related materials, and provides them with the kinds of attention reported to be preferred. Parents of the children observed from behind the one-sided mirror, watch the behaviors of the child, and give feedback to the data collector and manager who verified the occurrence of precursors or problem behaviors and the presence or absence of a calm state.

All 7 children completed the entire experiments. The average duration of each experimental session was 54.2 minutes (min=36.5 minutes, max=63.1 minutes, SD=11.5 minutes), with time variability across children largely due to differences in how long it took for each child to calm down during SR sessions. The body motion sensor garment is the most invasive component in the platform; 6 out of 7 children tolerated it without problem. Some children even put garment 501 on themselves. The only child who did not tolerate the garment 501 the entire time put it on at the beginning and then decided to take it off after 15 minutes because he was very touch sensitive.

The other platform component that one had to wear, the E4 wristband, was less invasive and tolerated well by all children. With regard to staying within the view of the Kinect, 1 child was unable to stay seated at the table throughout the entire experiment and instead spent some time on the floor with toys and thus the Kinect was not able to track the child for the entire duration of the experiment.

Multi-modal data was collected data using the systems and methods described above. Movement data collected at a sampling rate of 15 Hz. Raw signals for accelerations contain sensing noises and so a low-pass filter was applied with a cut-off frequency of 10 Hz. The threshold was chosen according to the usual speed of human motions so that the noises were filtered out while keeping information-rich signals for analysis. Peripheral physiological data including BVP and EDA were collected with the sampling rates of 64 Hz and 4 Hz, respectively. BVP signals were filtered by a 1 Hz to 8 Hz band pass filter. The EDA signals were not filtered. There were some missing data entries in the head rotations and facial expressions modalities. An interpolation algorithm was used to fill the sparse data. For the missing data points, we assign the numerical mean value of the 20 closest available head rotations and the most frequent class among the 20 closest available facial expressions, respectively.

From the processed and filtered data, different features were selected and extracted. Pitch, roll and yaw angles were computed as shown in the equations (1)-(3), above, to construct the upper body gestures. Certain patterns of gestures are significantly related to problem behaviors and gestures are an important indicator for it. Common gestures observed during problem behaviors include fist throwing, upper body swinging, laying back and repetitive arm movements. Besides gestures, average magnitude of accelerations of each joint can also be used as a measure of activity level as shown in equation (6). The activity level indicates the intensity of physical movements of the children. Fast and repetitive movements such as throwing fist and fidgeting are a common category of problem behaviors and these movements have increased activity level.

$$AL = \frac{\sum_{i=1}^{n}\sqrt{a_{x_i}^2 + a_{y_i}^2 + a_{z_i}^2}}{7} \tag{6}$$

Peripheral physiological data is a strong indicator of stress and several features including heart rate (HR) and skin conductance have been shown to have correlations with problem behaviors. Thus, we computed HR by inter-beat-intervals (IBI) of the BVP signal. From the EDA data, we separated and characterized the data into two types, which were tonic skin conductance level (SCL) and phasic skin conductance response (SCR). These features carry information about the stress level of a person.

Head banging is a very frequent problem behaviors reported for children with ASD who exhibit problem behaviors. Measures of head rotations can be used to predict head banging. Thus roll, pitch and yaw angles of the head were chosen a features. From facial expressions, we extracted features of closing of eyes and mouths, engagement, looking away and happy. Children often show their frustration and anger on their faces and facial expressions can help locate more insidious precursors.

Once all the features were extracted, we then synchronized the different data modalities with varying updating frequencies. Motion data modality had the highest updating frequency and we interpolated other features into each motion data interval to form multimodal data entries. First, the algorithm catches the next motion data entry. Secondly, the algorithm computes the relative time from the beginning of the experiment by its time stamp. Thirdly, the algorithm catches the most recent available values on other data modalities before that relative time point. Finally, the algorithm interpolates these values into the motion data entry. In this way, each of the multimodal data entry has all the features synchronized.

The software application of FIGS. 8 and 9 provides the time stamps of precursors of problem behaviors captured by the observers. With these time stamps, we can assign classes to each multimodal data entry between absence and presence of imminent precursor. With the insight from our IISCA practitioners we chose the data from 90 seconds prior to the episode of precursor to the point of precursor generation to be the most representative for precursors of problem behaviors. Thus, for the multimodal data entry, if the data entry was collected within 90 seconds prior to the precursor we assigned it the label 1. Otherwise, the class was assigned label 0. The two classes 0 and 1 have an average ratio of 6:4. For our experiment, each child had an average of 27242 samples.

In this experiment, individualized models were trained (based on data for each individual subject) and group models were also trained (based on aggregated data for all subjects). The individualized models were built with data of each child to adapt personal behavioral characters with better accuracy. The group models were built with data from all the children to explore the general group behavioral pattern. In order to find the most accurate ML algorithm, we explored several standard ML algorithms with our datasets. We used the library scikit-learn on Jupyter Notebook. The samples were randomly divided into training and test sets with a ratio of 80 to 20. Then we ran a 5-fold cross validation to compute the accuracies of each algorithm.

For individualized models, Random Forest (RF), k Nearest Neighbors (kNN), Decision Tree (DT) and Neural Network (NN) were found to have high prediction accuracies while Support Vector Machine (SVM), Discriminant Analysis (DA) and Naïve Bayes (NB) have comparatively lower accuracies. For group models, RF, kNN, and DT also show high accuracies while DA has significantly lower accuracy. SVM, NB and NN have higher prediction accuracies in group models as compared to individual models. Group model has the samples from all participants combined and the increased sample size would help the prediction to be more precise, but it may lose track of data pattern of individualized behaviors. Based on our observation, the problem behaviors of each child can differ significantly. This trade-off may be the reason that some models still have high accuracies for group models or even better performs while others have lower accuracies. The RF individualized model has the best average prediction accuracy.

The RF algorithm offers estimates of importance of each feature. The feature importance is computed as the total decrease in node impurity weighted by the probability of reaching that node. We also analyzed the relative importance of motion-based, physiology-based, and facial expression-based features. The features included were motion signals of each joint, physiological signals, head rotations and facial expressions. The results are consistent with the experimental observations. Main types of problem behaviors include the banging of torso and movement of right arm is more informative because it is the dominant side. Head Rotations has an importance of 0.0689 and Physiological data has an importance of 0.0331 including both HR and EDA. The Facial Expressions modality only has an importance of 0.0023.

We also analyzed the performance of the prediction algorithm when only motion-based and when only physiology-based features were used. We used the best performing algorithm RF to learn the data pattern of each child. The average prediction accuracies for the multimodal model, physiological data only model and motion data only model were 98.16%, 86.88% and 91.63%, respectively.

As mentioned earlier, we assigned the class of imminent precursor when the data was collected within the last 90 seconds prior to the observed precursor. To analyze the effect of the time window on the prediction of precursors, we varied the time window for the class of imminent precursors from 30 seconds prior to the observed precursor to 120 seconds in steps of 30 seconds. To avoid effects of different ratio of classes, we resample the minor class so that the two classes have a 1:1 ratio. Additionally, during the experiments, we observed that some of the problem behaviors needed some time to cool down after the observed precursors because it took some time for our therapists to intervene and for the child to calm down. Therefore, we also explored assigning the class of imminent precursor during a 10 seconds delay time after the observed precursor. It was shown that prediction accuracies for 30, 60, 90 seconds do not have significant differences but it significantly decreases for the 120 second time window. Also the models with the cool down window of 10 seconds had an average prediction accuracy increase of 0.06%. This analysis validates that the 90 seconds window seems to be the optimal window for precursor prediction that has good prediction accuracy with ample time for the caregivers to intervene.

Accordingly, the methods and system described herein provide, among other things, mechanisms for automatically detect precursor conditions for problem behavior based on multimodal data signals prior to the occurrence of the problem behavior using a trained machine-learning model. Other features and advantages of the invention are set forth in the following claims.

What is claimed is:

1. A system for predicting problem behavior in individuals with developmental and behavior disabilities, the system comprising:
 a wearable upper body motion sensing device including a plurality of inertial measurement units positioned at known positions relative to each other; and
 an electronic controller configured to
  receive output signals from each of the plurality of inertial measurement units while the wearable upper body motion sensing device is worn by a subject individual,
  model an upper body position of the subject individual by calculating one or more angles for body joints based on the output signals from the plurality of inertial measurement units, wherein the one or more angles include at least one selected from the group consisting of a roll angle, a pitch angle, and a yaw angle,
  apply a trained machine-learning model by providing, as input to the trained machine-learning model, an input data set that includes at least one selected from the group consisting of signal data from at least one inertial measurement unit, the upper body position information, and a sequence of upper body position information, wherein the trained machine-learning model is trained to produce as output, in response to receiving the input data set, an indication of whether a precursor to the problem behavior is detected, and generate a notification indicating that the precursor to the problem behavior is detected in response to the trained machine-learning model producing an output indicating that the precursor to the problem behavior has been detected.

2. The system of claim 1, wherein the wearable upper body motion sensing device further includes a wearable upper body garment, wherein each of the plurality of inertial measurement units is affixed to the wearable upper body garments at positions such that, when the wearable upper body garment is worn by the subject individual the plurality of inertial measurement units includes a first inertial measurement unit positioned on a right forearm of the subject individual, a second inertial measurement unit positioned on a left forearm of the subject individual, a third inertial measurement unit positioned on a right upper arm of the subject individual, a fourth inertial measurement unit positioned on a left upper arm of the subject individual, and a fifth inertial measurement unit positioned on a back of the subject individual.

3. The system of claim 2, wherein the wearable upper body garment includes at least one selected from the group consisting of a shirt, a crewneck sweatshirt, and a hooded sweatshirt.

4. The system of claim 3, wherein the wearable upper body garment includes the hooded sweatshirt and wherein cabling and electronic circuitry for the wearable upper body motion sensing device is positioned within a hood of the hooded sweatshirt.

5. The system of claim 2, wherein the wearable upper body garment includes a plurality of pockets positioned at different locations on the wearable upper body garment, wherein each pocket of the plurality of pockets is sized to receive a different individual inertial measurement unit of the plurality of inertial measurement units.

6. The system of claim 5, wherein each pocket of the plurality of pocket is selectively closeable by a hook-and-loop closure material.

7. The system of claim 1, wherein the system further includes at least one physiological sensor, wherein the electronic controller is further configured to receive output signals from the at least one physiological sensor, and wherein the electronic controller is configured to apply the trained machine-learning model by providing, as input to the trained machine-learning model, an input data set that further includes at least one selected from the group consisting of signal data from the at least one physiological sensor and biometric feature metrics extracted from the signal data from the at least one physiological sensor.

8. The system of claim 7, wherein the electronic controller is further configured to extract at least one biometric feature from the signal data from the at least one physiological sensor, the at least one biometric feature being selected from the group consisting of a bioimpedance, a heart rate, a skin conductance, and a body temperature.

9. The system of claim 7, further comprising a wrist worn device including the at least one physiological sensor, wherein the wrist worn device has an appearance of a wristwatch.

10. The system of claim 1, further comprising a microphone, wherein the electronic controller is configured to receive output signals from the microphone and to extract at least one audio feature from the audio data, the at least one audio feature being selected from the group consisting of individual words, individual phrases, a change in verbal pitch of the subject individual, and a change in verbal volume of the subject individual, and wherein the electronic controller is configured to apply the trained machine-learning model by providing, as the input to the trained machine-learning model, an input data set that further includes at least one selected from the group consisting of the audio data and the at least one audio feature extracted from the audio data.

11. The system of claim 1, wherein the electronic controller is configured to generate the notification indicating that the precursor to the problem behavior is detected by causing a portable device associated with at least one individual to output the notification, wherein the at least one individual is selected from the group consisting of the subject individual, a parent of the subject individual, a caregiver of the subject individual, a teacher of the subject individual, and a therapist of the subject individual.

12. The system of claim 1, wherein the electronic controller is configured to generate the notification indicating that the precursor to the problem behavior is detected by causing a portable device associated with the subject individual the notification indicating that the precursor has been detected and identifying a recommended mitigation to prevent the problem behavior from occurring.

13. The system of claim 1, wherein the electronic controller is further configured to receive a first user input indicative of an occurrence of a false positive and a second user input indicative of an occurrence of a false negative, wherein the first user input indicates that the machine-learning model determined that a precursor had been detected when not precursor or problem behavior was observed by the user, wherein the second user input indicates that the machine learning model did not determine that the precursor had been detected when precursor or problem behavior was observed by the user, and retrain the machine-learning model by determining a ground truth label based on the first user input or the second user input and mapping the new ground truth label to signal data from plurality of inertial measurement units captured at a same time as the first user input or the second user input is received.

14. A method of training the machine-learning model used in the system of claim 1, the method comprising:

equipping the subject individual with the wearable upper body motion sensing device;

administering a behavior assessment while recording signal data from the plurality of inertial measurement units, wherein administering the behavioral assessment includes a controlled sequence of actions in which the subject individual is exposed to stimulus that may provoke the problem behavior and the precursor;

receiving, from a user through a computer-based user device, real-time indications of observed occurrences of the problem behavior and observed occurrences of the precursor while the behavior assessment is administered;

generating a set of training data by defining a plurality of ground truth labels based on the received real-time indications of the observed occurrences of the problem behavior and the observed occurrences of the precursor, and mapping each real-time indication to recorded signal data from the plurality of inertial measurement units; and training the machine-learning model to produce an output corresponding to the ground truth label in response to receiving as input at least one selected from the group consisting of the signal data from at least one inertial measurement unit mapped to the ground truth label, upper body position information determined based on the signal data mapped to the ground truth label, and a sequence of upper body position information determined based on the signal data mapped to the ground truth label.

15. The method of claim 14, wherein administering the behavior assessment includes administering an interview-informed synthesized contingency analysis (IISCA).

16. The method of claim 14, wherein training the machine-learning model includes training an individualized machine-learning model based only on ground truth labels and recorded signal data for the subject individual.

17. The method of claim 14, wherein training the machine-learning model includes training a group machine-learning model based on aggregated ground truth labels and recorded signal data for each of a plurality of subject individuals.

18. The system of claim 1, wherein the electronic controller is further configured to:
compute a position and an orientation of each body joint of the body joints using forward kinematics based on the one or more angles.

19. The system of claim 1, wherein the electronic controller is further configured to:
synchronize data modalities having different update frequencies by using the output signals from the plurality of inertial measurement units as a base timeline and interpolating data modalities different from the output signals from the plurality of inertial measurement units into intervals of the base timeline to form unified multimodal data entries.

* * * * *